United States Patent
Bergquist et al.

(10) Patent No.: US 12,472,958 B2
(45) Date of Patent: Nov. 18, 2025

(54) VEHICLE LOCALIZATION SYSTEM

(71) Applicant: Volvo Autonomous Solutions AB, Gothenburg (SE)

(72) Inventors: Stefan Bergquist, Gothenburg (SE); Linus Hagvall, Gothenburg (SE); Christian Grante, Västra Frölunda (SE)

(73) Assignee: VOLVO AUTONOMOUS SOLUTIONS AB, Gothenburg (SE)

( * ) Notice: Subject to any disclaimer, the term of this patent is extended or adjusted under 35 U.S.C. 154(b) by 149 days.

(21) Appl. No.: 18/070,200

(22) Filed: Nov. 28, 2022

(65) Prior Publication Data

US 2023/0202491 A1   Jun. 29, 2023

(30) Foreign Application Priority Data

Dec. 23, 2021   (EP) ..................................... 21217602

(51) Int. Cl.
| | |
|---|---|
| *H04W 4/40* | (2018.01) |
| *B60W 40/12* | (2012.01) |
| *B60W 50/02* | (2012.01) |
| *H04W 4/02* | (2018.01) |

(52) U.S. Cl.
CPC ........ *B60W 50/0205* (2013.01); *B60W 40/12* (2013.01); *H04W 4/025* (2013.01); *H04W 4/40* (2018.02); *B60W 2300/125* (2013.01)

(58) Field of Classification Search
None
See application file for complete search history.

(56) References Cited

U.S. PATENT DOCUMENTS

| | | | |
|---|---|---|---|
| 8,229,472 B2 | 7/2012 | Fireaizen | |
| 8,392,105 B2 | 3/2013 | Deborough | |
| 10,769,392 B1 | 9/2020 | Gravelle et al. | |
| 2013/0193276 A1 | 8/2013 | Hunter | |
| 2017/0074964 A1* | 3/2017 | Xu | G01S 13/74 |
| 2019/0080612 A1 | 3/2019 | Weissman et al. | |
| 2019/0138000 A1* | 5/2019 | Hammond | B60W 50/0205 |
| 2020/0319638 A1* | 10/2020 | Bowen | G05D 1/0257 |
| 2021/0080568 A1* | 3/2021 | Brown | G01S 13/87 |
| 2021/0082291 A1* | 3/2021 | Villa | H04W 4/46 |
| 2022/0219708 A1* | 7/2022 | Chakravarty | G06T 17/10 |

(Continued)

OTHER PUBLICATIONS

Extended European Search Report dated May 25, 2022 for European Patent Application No. 21217602.8, 8 pages.

(Continued)

*Primary Examiner* — James M McPherson
(74) *Attorney, Agent, or Firm* — Sage Patent Group (57) ABSTRACT

A method of verifying a position of a vehicle using a vehicle-mounted device, the method including generating first position data for the vehicle-mounted device responsive to receiving data from a transponder-based localization system, generating second position data for the vehicle-mounted device responsive to receiving data from another localization system; and reporting verified vehicle position data for the vehicle, based on a comparison of the data from the other localization system with the data from the transponder-based localization system for the vehicle-mounted device.

15 Claims, 7 Drawing Sheets

(56) References Cited

U.S. PATENT DOCUMENTS

2022/0379910 A1* 12/2022 Hagaribommanahalli ................. G06V 10/803
2023/0114494 A1* 4/2023 Giddens ................. B61L 27/70 246/473 R

OTHER PUBLICATIONS

European Office Action, European Patent Application No. 21217602.8, mailed Mar. 3, 2025, 6 pages.

* cited by examiner

VEHICLE LOCALIZATION SYSTEM

CROSS REFERENCE TO RELATED APPLICATIONS

The present application claims benefit of priority to European Patent Application No. 21217602.8, filed Dec. 23, 2021, and is assigned to the same assignee as the present application and is incorporated herein by reference in its entirety.

TECHNICAL FIELD

The present disclosure relates to a vehicle localization system and to various related aspects, including a method of positioning a vehicle.

In particular, but not exclusively the disclosed technology relates to a vehicle position monitoring system which decides on a correct vehicle pose based on a comparison between a vehicle pose determined from a transponder-based positioning system and another positioning system. The disclosed technology is able to determine a vehicle's current pose, in other words the current position and heading, or orientation of, a vehicle in a more reliable manner by regularly verifying the vehicle's position and/or pose using at least two independent position/pose determining techniques. This is particularly useful for vehicles which are automated vehicles, for example, autonomous or semi-autonomous vehicles. The disclosure will be described mainly with respect to vehicles, however, such vehicles may include heavy-duty vehicles, such as semi-trailer vehicles and trucks as well as other types of vehicles such as cars.

BACKGROUND

It is important for autonomous vehicles to be correctly located, in other words, for a vehicle's position to be determined in a particular geographic location, in order to navigate the vehicle and also, based on the local environment of the vehicle, to make sure that the vehicle is safe.

It is highly desirable to be able to monitor where a vehicle is in a reliable manner, in other words to obtain a high-integrity position, especially if the vehicle is a heavy-duty vehicle. A modern heavy-duty vehicle may comprise a wide range of different physical devices, such as combustion engines, electric machines, friction brakes, regenerative brakes, shock absorbers, air bellows, and power steering pumps. These physical devices are commonly known as Motion Support Devices (MSD). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine.

In other words, ideally a vehicle's positions and pose should be determined with a sufficient degree of confidence that they can be relied upon as the true vehicle poses/positions, for the determined values to be trusted for safety applications.

There are many ways that positioning of a vehicle can be done today. Two commonly used methods are GNSS and matching a LIDAR point-cloud reading to a pre-recorded map, also known as scan matching. It is known to use several methods to be used to determining positioning of an autonomous vehicle to achieve higher reliability. However, even if methods are combined, it is still hard to show that the solution is reliable enough. First of all, each used source must be shown to have high performance on its own (which might be tricky to achieve for all situations). Moreover, the methods may be independent, meaning that they don't have common cause of failures. Eliminating common causes of failure is not easy, as, for example, many autonomous vehicles may not have other means of intrinsically determining their position, for example, on-board LIDAR and camera system are both likely to suffer in low visibility situations such as rain or snow and so could suffer from similar failures in accuracy. In other words, they could both get problems in dark and bad weather meaning that there may rare situations where both sources fail to work in a sufficiently reliable manner. It is also well known to introduce redundancy to provide more fail-safe techniques, for example, two sensors may be used instead of one to achieve higher integrity for their combined results.

Autonomous vehicles may be configured to follow a path by responding to various control signals generated as a result of their current position compared to the path. For example, a current ego-vehicle position may be compared to a desired trajectory and, based on the difference, actuator control signals are generated which result in the ego-vehicle following the desired trajectory. It is accordingly very desirable to provide more reliable high-integrity position determining technique which can adapt to various environmental environments and conditions. As another example, determining a current ego-vehicle position more reliably may improve safety as if an ego-vehicle moves out of an area where it is allowed to operate into another area where that vehicle is not allowed to be, the control system can cause the ego-vehicle to stop its operational task(s) and/or stop movement and/or return along a safe trajectory to the area where the ego-vehicle is allowed to operate.

SUMMARY STATEMENTS

The disclosed technology seeks to mitigate, obviate, alleviate, or eliminate various issues known in the art. Whilst some aspects of the disclosure are defined by the accompanying claims, various aspects of the disclosed technology including the claimed technology are set out in this summary section with examples of some embodiments and indications of possible technical benefits. A first aspect of the disclosed embodiments relates to a method of verifying a position of a vehicle using a vehicle-mounted device, the method comprising generating first position data for the vehicle-mounted device responsive to receiving data from a transponder-based localization system, generating second position data for the vehicle-mounted device responsive to receiving data from another localization system, and reporting verified vehicle position data for the vehicle, based on a comparison of the data from the other localization system with the data from the transponder-based localization system for the vehicle-mounted device. The vehicle may be an automated vehicle, for example, an autonomous or semi-autonomous vehicle in some embodiments.

In some embodiments, the vehicle is also or instead a heavy-duty vehicle.

Advantageously, this allows position and/or pose data of a vehicle (wherein pose data includes position data along with at least a vehicle heading) to be obtained and verified as high-integrity data which allows the data to be assigned more weight by the control systems of the vehicle when operating the vehicle.

Some other example embodiments of the method are set out below in the description and in the accompanying claims.

Another, second, aspect of the disclosed technology comprises a control system for a vehicle having an automated driving system, ADS, the control system comprising memory, one or more processors, a data interface configured to receive verified vehicle position or pose data from a vehicle positioning system of the ADS configured to implement a method according to the first aspects or any of its embodiments. The control system may also be configured, responsive to receiving verified vehicle position or pose data, to generate one or more control signals for controlling the operation of the vehicle.

Some other example embodiments of the control system are set out below in the description.

Another, third, aspect of the disclosed technology relates to a vehicle-positioning device configured to be mounted in use on a vehicle, the vehicle-positioning device comprising: means to generate first position or pose data responsive to receiving data from a transponder-based localization system; means to generate second position or pose data for the vehicle responsive to receiving data from another localization system; and means to report verified vehicle position or pose data for the vehicle, based on a comparison of the data from the other localization system with the data from the transponder-based localization system.

In some embodiments of the device, the device is configured in use to: determine a first position of the device, relative to at least one transponder detected using a transponder-based localization system, wherein the at least one transponder has a known geographical location associated with a transponder identifier in the transponder-based localization system, determine a second position of the device using a secondary localization system different to the transponder-based localization system, and verify the first position of the device based on the known geographical location associated with the transponder identifier in relation to the determined second position of the device.

Some other example embodiments of the vehicle-positioning device are set out below in the description.

A fourth aspect of the disclosure relates to a computer program product configured to be used by a device mounted on or integrated in a vehicle, wherein the computer program product comprises computer-code which when executed by one or more processors of the vehicle, causes the vehicle to implement a method of verifying a position of the device according to the first, method, aspect or any one of the embodiments of the method aspect disclosed herein.

A fifth aspect of the disclosed technology comprises a computer program carrier carrying a computer program comprising computer-program code, which, when loaded from the computer program carrier and executed by one or more processors or processing circuitry of a vehicle having an automated driving system, causes the vehicle to implement a method according to the first aspect, wherein the computer program carrier is one of an electronic signal, optical signal, radio signal or computer-readable storage medium.

The disclosed aspects and embodiments may be combined with each other in any suitable manner which would be apparent to someone of ordinary skill in the art.

BRIEF DESCRIPTION OF THE DRAWINGS

Some embodiments of the disclosed technology are described below with reference to the accompanying drawings which are by way of example only and in which.

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Steps, whether explicitly referred to a such or if implicit, may be re-ordered or omitted if not essential to some of the disclosed embodiments. Like numbers in the drawings refer to like elements throughout.

The terminology used herein is for the purpose of describing particular aspects of the disclosure only, and is not intended to limit the disclosed technology embodiments described herein. As used herein, the singular forms "a", "an" and "the" are intended to include the plural forms as well, unless the context clearly indicates otherwise.

Figure 1A:
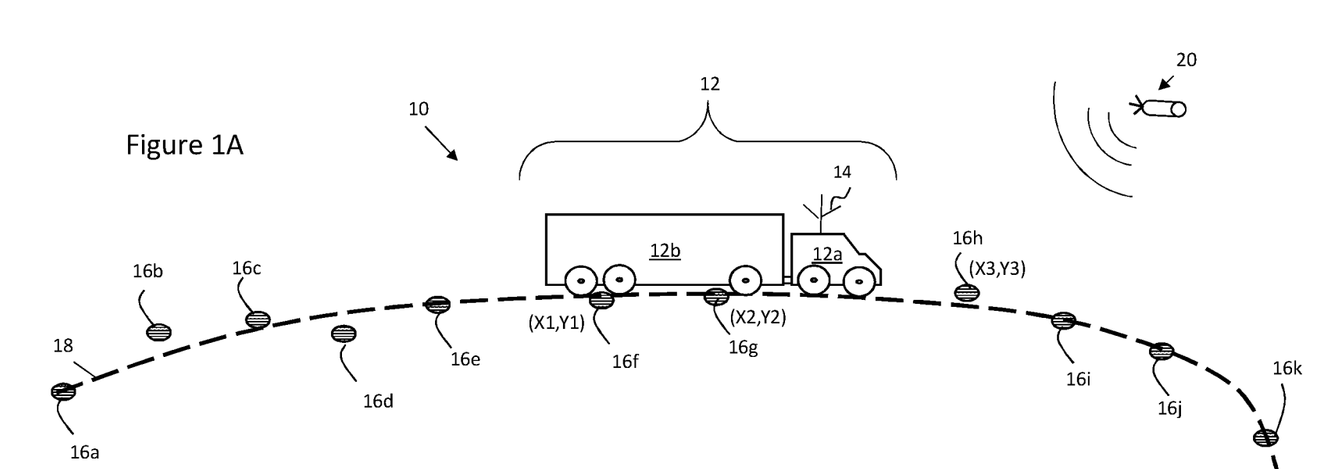
FIG. 1A schematically illustrates a vehicle localization system according to some embodiments of the disclosed technology.

FIG. 1A illustrates schematically how a vehicle localization system 10 according to some embodiments of the disclosed technology is used to verify a vehicle position determined using a transponder based localization system using another localization system. The vehicle may be a heavy-duty vehicle in some embodiments, for example, a semi-trailer vehicle or truck or another type of vehicle such as a car.

In FIG. 1A, a vehicle 12, illustrated in FIG. 1 as a heavy-duty vehicle in the form of an articulated truck comprising a cab 12*a* and trailer 12*b*, is equipped with at least one antenna 14 and is suitably configured to detect one or more transponders 16 along a vehicle path 18.

As shown In FIG. 1A, vehicle 12 is also equipped with another vehicle localization system. For example, a Global Navigation Satellite Systems localization system may also be used by vehicle 12 in some embodiments of the disclosed technology. Another commonly used method of positioning a vehicle which is known in the art comprises scan matching where a LIDAR point cloud reading is matched to a pre-recorded map. Multiple systems are often used to achieve higher reliability in determining the position of some vehicles such as, for example, autonomous vehicles. However, whilst there is an expectation that the use of multiple systems will result in a more reliable determination of the position of a vehicle evidencing this can be challenging. For example, each used source of positioning information may differ as to its accuracy in various situations which an autonomous vehicle could encounter.

In some embodiments, the vehicle positioning system 10 for a vehicle 12 is configured to verify a position of the vehicle using a vehicle-mounted device which may be fitted to the vehicle in production or as an after-fit however, in other embodiments the vehicle may be manufactured to have a control system that can implement the disclosed methods for verifying a position of the vehicle.

Figure 2:
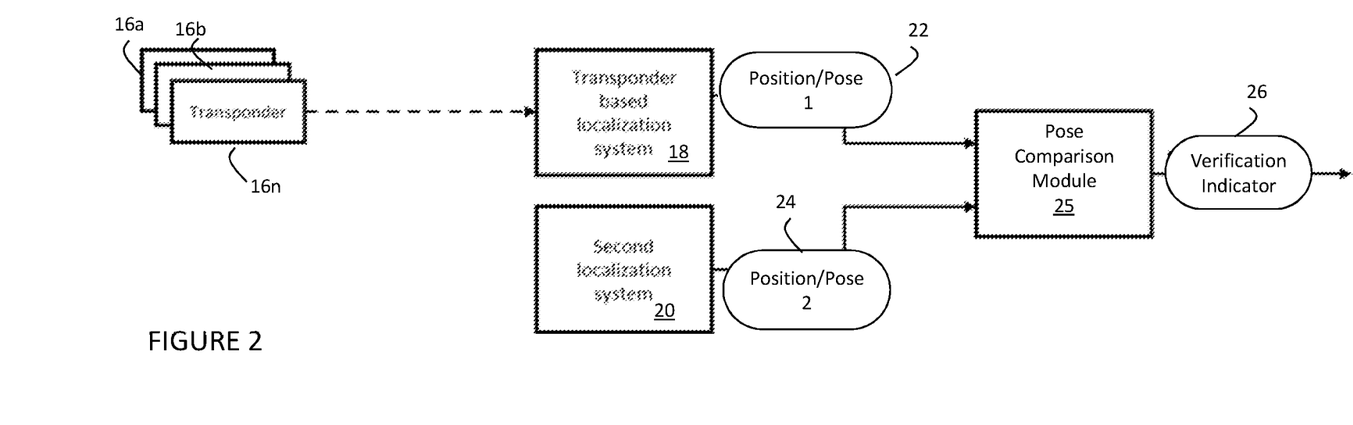
FIG. 2 illustrates schematically how poses are generated and compared in a vehicle localization system according to some embodiments of the disclosed technology.

The vehicle positioning system comprises a transponder-based localization system, for example, the system 18 shown in FIG. 2 of the drawings, and another localization system, for example, the system 20 shown in FIG. 2 of the drawings, where the other localization system is also configured to determine a vehicle position or pose of the vehicle. The vehicle position data from the other position system may verified regularly, for example, within certain periods of time from the last verified position update, based on position data from the transponder system determined using the vehicle-mounted device. The vehicle positioning system includes a pose comparison module 25 (see FIG. 2) in some embodiments which is to perform one of the method embodiments disclosed herein for verifying a position of a vehicle In a vehicle localization system according to the disclosed embodiments, a transponder-based localization system provides data which is compared with another type of localization system which is independent from the transponder system. Examples of localization systems which are suitably independent from a transponder localization system include GNSS or scan matching systems.

As shown in FIG. 1A, transponders have been placed along an intended vehicle path 18 indicated by a dashed line within an intended operation site for the vehicle 12. The transponders 16a-16k may be put along the intended vehicle path or, alternatively, be arranged in a pattern relative to the vehicle path that allows reasonably frequent detection of the transponders given expected vehicle speeds, or may be otherwise arranged around the site where the autonomous vehicle is to operate.

Figure 1B:
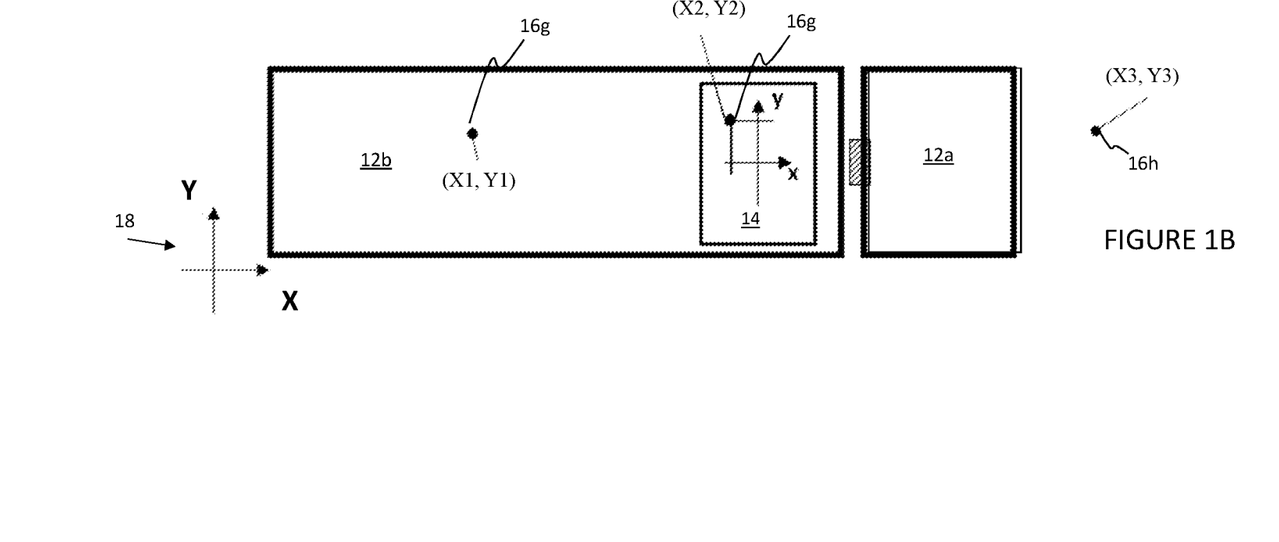
FIG. 1B schematically illustrates a vehicle travelling in a transponder localization system according to some embodiments of the disclosed technology.

FIG. 1B, illustrates a plan view of the vehicle 12 shown in FIG. 1A. In FIG. 1B vehicle 12 is illustrated as an articulated truck comprising a cab 12a and trailer 12b. Antenna 14 is located on a roof of the trailer 12b as shown in FIG. 1B. As shown in FIG. 1B, a transponder 16 having a first position (x, y1) and another transponder 16 having a second position (x2, y2) are located on the ground beneath the truck 12.

A coordinate system (x,y) is used to determine the position of the transponders relative to the pose of the truck, where pose comprises the position of the truck and the heading or orientation of the truck, as detected by an antenna in an antenna-based origin local coordinate system. The position of each transponder in the operational site of the vehicle will also be known in some other suitable coordinate system (X, Y), for example, a GNSS positioning coordinate system.

Each transponder is programmed with an identifier, ID, and its position measured, recorded, and associated with its ID. This information may be stored on the transponder in some embodiments, however in other embodiments it may be retrieved from a remote storage server. When vehicle 12 moves within proximity of a transponder the antenna of the vehicle will read the ID of the transponder and obtain the transponder's position either directly from the transponder or retrieve it from another data source, for example, by performing a suitable look-up or querying operation using the transponder ID. The position of the transponder relative to the antenna is also determined by the vehicle. By determining the location of transponder, for example, the transponder location (X1, Y1), and combining this with the relative position (x1, y1) of the vehicle to the transponder the exact vehicle position (X1, Y1)+(x1, y1) can be calculated by the transponder localization system. In this way, the transponder position is determined relative to the vehicle and using a stored the position of the antenna in the vehicle. The vehicle can then be localised in an absolute frame by combining the relative transponder location with the absolute transponder location. In other words, another localisation system 20 (see FIG. 2 described in more detail below) localizes the vehicle in relation to some items (for example satellites for GPS, or landmarks for laser-scanning). The transponder-based localization system 18 localizes the vehicle in relation to transponders. The measurements are then transformed to a common frame. So, for example, in some embodiments, if global position system, GPS, coordinates are used by the other localization system 20, the GPS position of each transponder is known and the vehicle position can then be acquired from the transponder-based localization system.

Figure 1C:
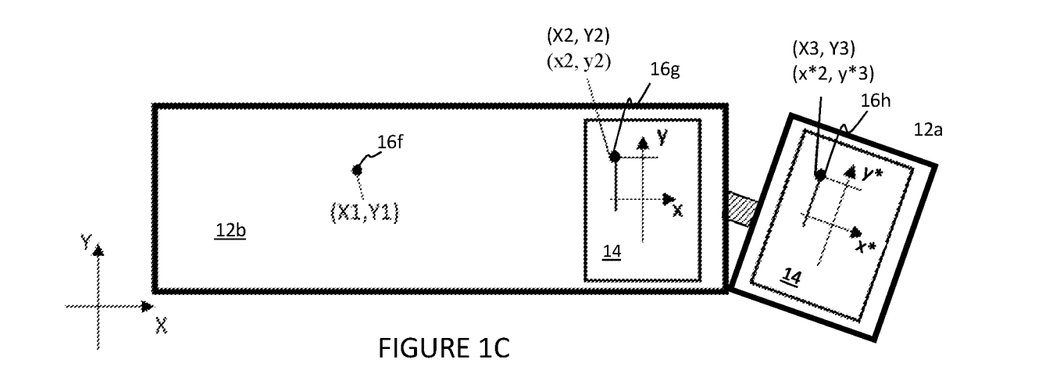
FIG. 1C schematically illustrates how a vehicle may be at a location with different poses depending on the heading of the vehicle.

FIG. 1C shows schematically how a vehicle may be at a location with different poses depending on the heading of the vehicle. As shown in FIG. 1C, the heading of the vehicle cab 12a different from that shown in FIG. 1B despite the trailer having the same heading.

A vehicle pose is typically considered as the vehicle heading and its current position, however, references herein to pose may also include a reference to position unless clearly excluded. However, in embodiments where a vehicle is an articulated vehicle such as is shown in FIG. 1C, for example, where a cab or tractor and a trailer form the vehicle, the pose may include information about the trailer as well and also the articulation angle or position and heading information for trailer as well. Where a reference has been made herein to a vehicle, this also includes articulated vehicles which may have a separate antenna on the trailer and then be able to perform a complete pose estimation for the entire vehicle combination.

FIG. 2 illustrates schematically how a pose, pose 1, generated by the transponder-based localisation system 22 using the transponder fixed positions and the relative position of transponders to the vehicle antenna system 14, are compared with poses generated by a second localisation system, such as a GNSS localization system 20 as shown in FIG. 1A.

According to the disclosed technology, once the position of a transponder has been calculated in the transponder-based localisation system 22, the pose is sent to a pose comparison module or subsystem 25 of the vehicle control unit.

When a new pose is received by the pose comparison system 25 a comparison is triggered between the newly arrived pose and a pose from a second localisation system. If the poses are determined to have similar enough characteristics, for example, if the difference in the antenna-based XY and heading position information is smaller than some threshold values), a pose is then forwarded from the pose comparison component 25 of the vehicle localization system for use in this automated driving system of the vehicle 12.

If the poses however are not similar enough, this is reported to the ADS for appropriate action or actions.

The second localisation system 20 could use any other technology for positioning which is independent for the transponder-based system in some embodiments. For example scan matching may be used in some embodiments. By providing two independent localisation systems both systems will not fail due to the same root cause. Since the technology use of the transponder-based localisation is rather unique, it will be independent from other technologies such as GNSS or scan matching. In some embodiments the second localisation system 20 could also be a system that uses a fusion between several different localisation technologies. Such fuse systems are also known in the art.

Figure 3:
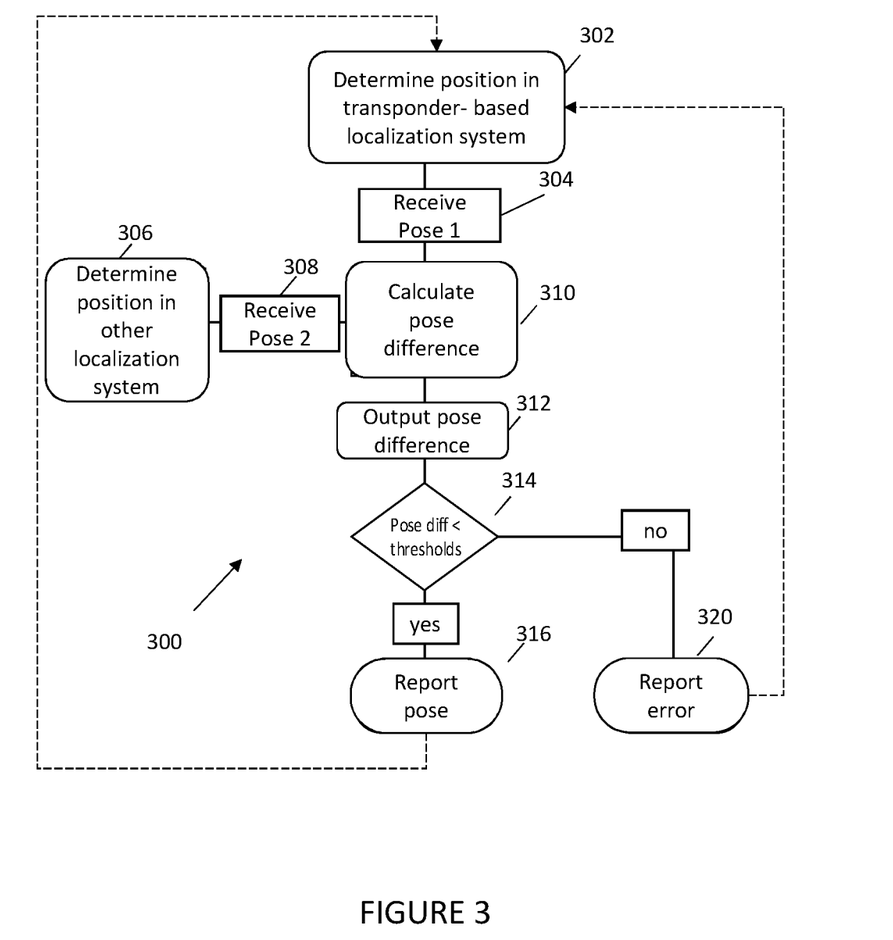
FIG. 3 is a flow chart of a first pose comparison process used by a vehicle localization system according to some embodiments of the disclosed technology.

FIG. 3 illustrates schematically in more detail an embodiment of a method of verifying a vehicle's pose in which a pose comparison is performed by a pose comparison unit 25 according to the disclosed technology.

In FIG. 3, a transponder localisation system 18 determines 302 a vehicle position/pose, referred to herein as first pose 1. This is output to the pose comparison module or unit 25, which, when it receives the first pose compares the first pose with second pose information received 308 from another localisation system 22. The pose information is compared using time-stamp information. The second localization system 22 operates independently of the first vehicle localisation system 20.

The difference between the two poses is then calculated 310 and a pose difference is output 312 for comparison against a pose difference threshold.

If the determined 314 pose difference is within a predetermined range from the difference threshold, the pose is output reported 316 to the vehicle's assisted driving system. If, however, the pose difference between the two methods is too great for the determined poses to be considered reliable indicators of the vehicle's actual pose, the vehicle positioning system, VPS, 10 will report 320 an error.

In this manner, the degree of confidence in a pose (or position) determined using transponder based localisation system as being a correct pose or position can be increased as it has been independently verified by the second, independent, localization system, such as a GNSS system. This advantageously means that if a transponder is accidentally moved, a vehicle can know when to disregard its position based on a particular transponder in some embodiments.

The position or pose which is calculated in the transponder-based localisation system, may be represented by x, y coordinates in some embodiments and in addition, a heading if a pose is to be compared. The determined position or pose information which is sent to the pose comparison system 25 comprises the x, y and heading parameters.

Receiving this information triggers a comparison between the received pose or position information and the position or pose information which has been independently received from a second different, localization system.

If the poses are similar enough (the difference in x, y and heading is smaller than some threshold values for example), the transponder determined pose is forwarded from the pose comparison module 25, in other words to the pose comparison component, or unit of the localization system or device of the vehicle which is configured to perform the pose comparison. In some embodiments, the vehicle localisation may be provided by a separate device or component which is integrated into the vehicle or which mounted on the vehicle, and which is configured as part of an ADS of the vehicle. In some embodiments, the pose comparison device may be part of a control system or unit of the vehicle to output actuator signals to control the vehicle operation, for example, its speed and trajectory. The ADS may be configured to be part of a vehicle control system in some embodiments, however, in some embodiments, the control system may be part of the ADS, for example, if a vehicle is a fully autonomous vehicle.

Figure 7:
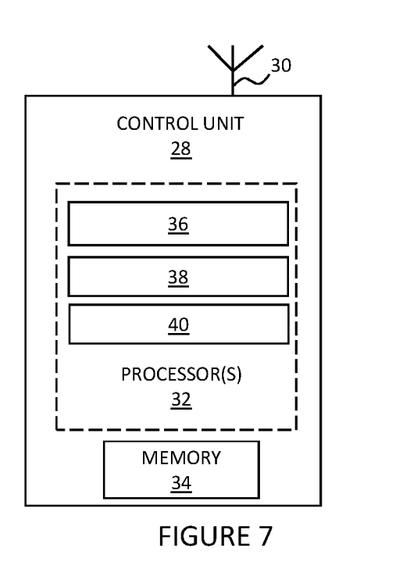
FIG. 7 illustrates schematically an apparatus configured to implement one or more methods according to the disclosed embodiments.

If the pose comparison determines the poses are not similar enough, in other words, if the difference in pose and/or position of the vehicle between the pose and/or position determined using the transponder localization system and the other localization system, is bigger than a threshold, the pose comparison module 25 is configured to send an error report indicating there is a pose/position localization error to the ADS and/or a control unit of the vehicle This allows the control unit 28 of the vehicle to generate control signals for the vehicle to take appropriate action (FIG. 7 shown an example of a control unit which may include or be included in or otherwise communicate with an ADS of the vehicle).

The other localization system, can use any other technology for vehicle positioning which is independent from the transponder-based system. This means that they cannot fail due to the same root cause. Since the technology used in the transponder-based localization is rather unique, it is believed that it is independent from most other technologies, such as, GNSS or scan-matching. The second localization system could also be a fusion between several localization technologies. For example, an inertial measurement unit, IMU, may be used as well to determine vehicle pose. In some embodiments, for example, when a vehicle is articulated, a plurality of IMUs, or any other type of suitable device for determining orientation, may be provided, which one IMU on each articulated part of the vehicle in order to determine the entire vehicle pose.

Figure 4:
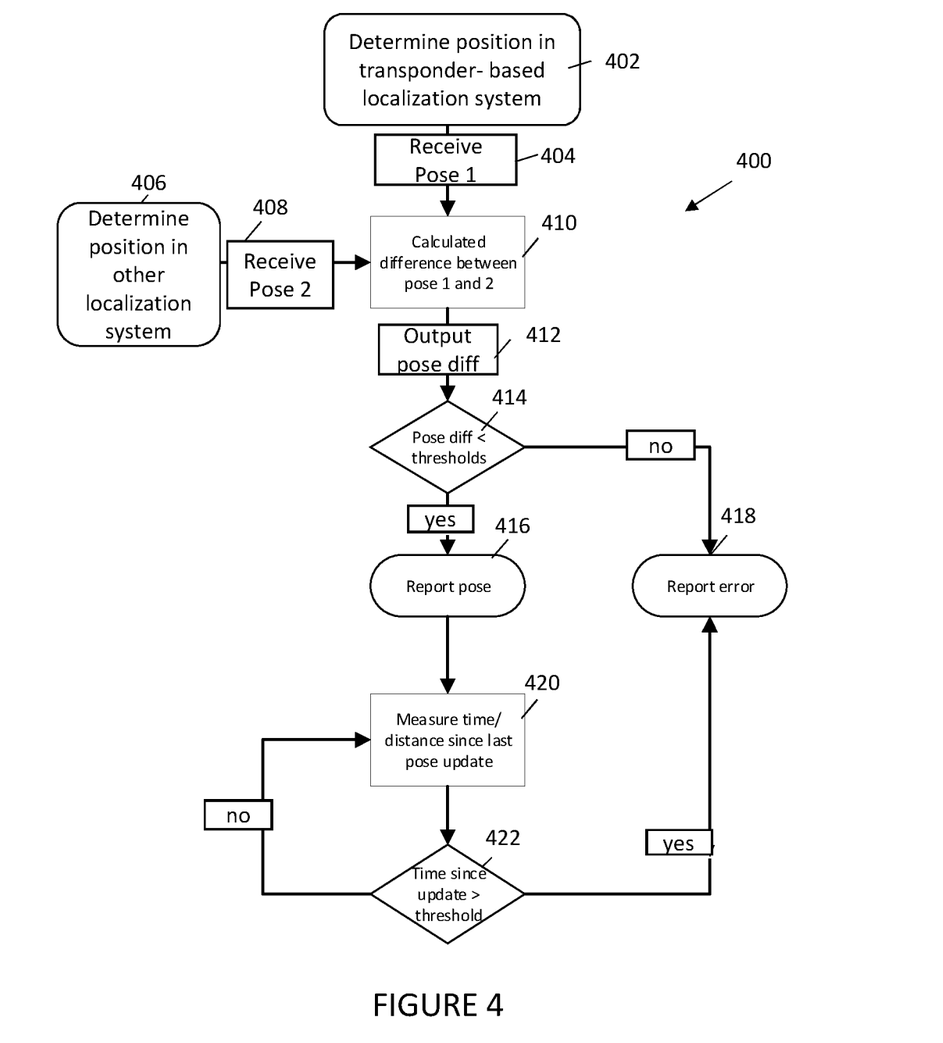
FIG. 4 is a flowchart of a second pose comparison process used by a vehicle localization system according to some embodiments of the disclosed technology.

FIG. 4 is a flowchart of a second pose/position verification process used by a vehicle localization system according to some embodiments of the disclosed technology.

In FIG. 4 the method comprises first determining 402 the vehicle position and/or pose in the transponder based localisation system and outputting this information as first pose information to a comparison module. Responsive to receiving 404 the first pose information, the comparison module obtains 408 second pose information determined 406 by another localization system. The difference between the two poses is then calculated 410 by a pose comparison module 25 or the like and the pose difference is output 412 for comparison 414 against a pose difference threshold. If the difference in poses is less than the pose difference threshold, the pose is reported as a verified pose, in other words, pose 1 (which may represent a pose or a position in some embodiments) is reported to the ADS as a pose/position for which there is a higher level of confidence that the pose/position is correct.

In addition, in some embodiments optionally, the time between sensor readings of transponders, in other words, since the last localization update of a pose/position of the vehicle is also determined 628 and compared 630 with a reference value based on the predetermined trajectory of the vehicle and the known positions of transponders along that vehicle's trajectory. If the time since the last pose/position update is above the threshold, then an error is reported 632. If the time is less than the latest update time is stored for future reference against subsequent pose/position updates.

Figure 5:
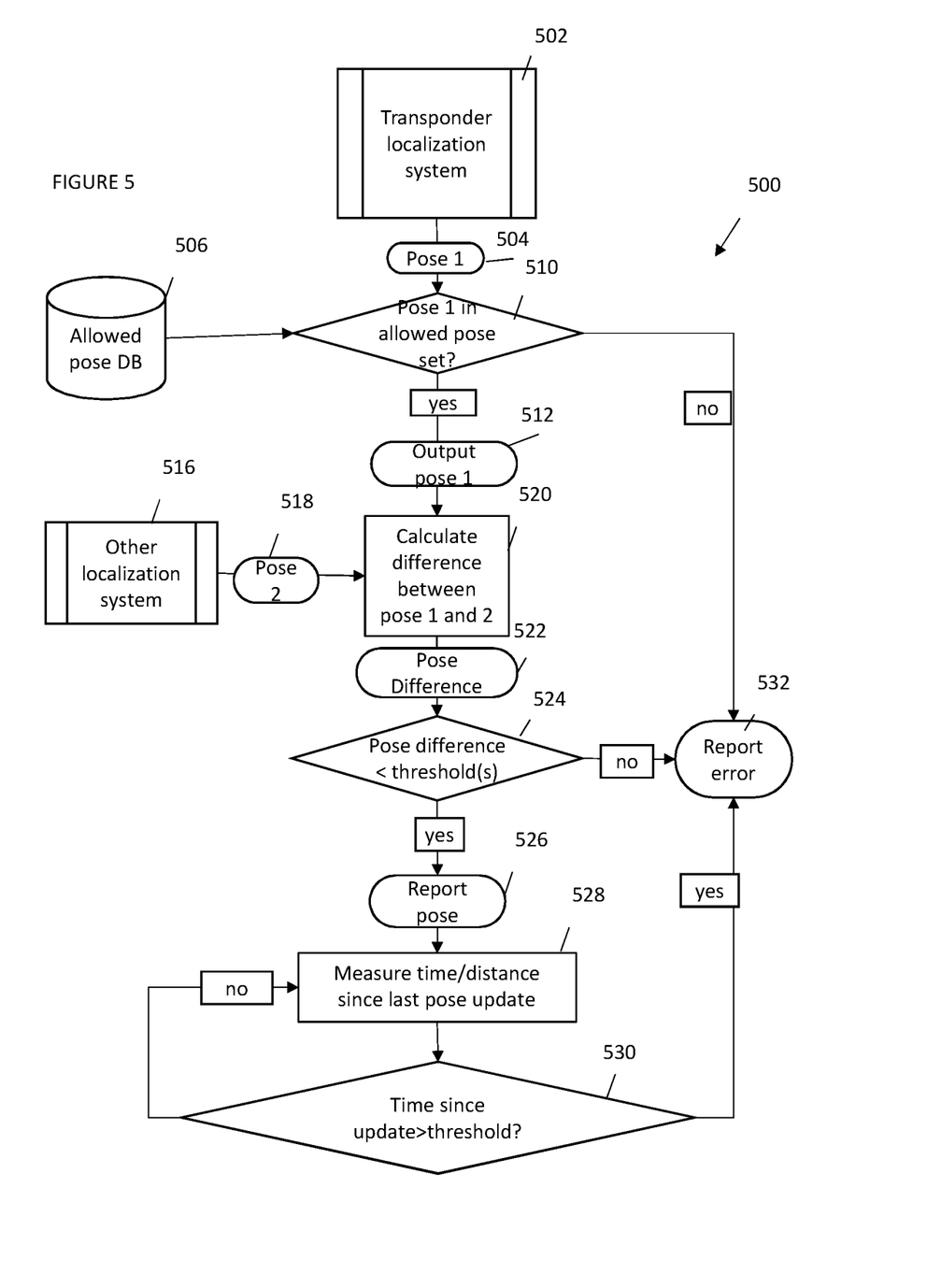
FIG. 5 is a flowchart of a third comparison process used by a vehicle localization system according to some embodiments of the disclosed technology.

FIG. 5 is a flowchart of a third pose/position verification method which may be performed by a localisation system of a vehicle according to some other embodiments of the disclosed technology. In FIG. 5, the vehicle's transponder localization system 502 outputs 502 a first pose or position of a vehicle 504. A check 510 is then performed to assess if the first pose or position is an allowed pose or position by querying 508 if the pose or position is in an allowed pose or position set, which may be a subset of allowed poses or positions stored 506 in an allowed pose or position data base 506. If the pose or position is an allowed pose or position, the transponder localisation system 18 outputs 512 pose 1 to the pose comparison module 25 for comparison with another, second, pose or position 518 output by the other localisation system 20. The other pose or position, shown as second pose in FIG. 5, is determined 516 using position information obtained from the other localisation system 20 used by the vehicle, for example, a GNSS localisation system. The pose comparison module 25 then calculates the difference between the first pose and the second pose and outputs the pose difference for comparison against a pose difference threshold(s). If the pose difference is above the pose difference threshold, an error is reported to the vehicle's ADS and/or control system which indicates the localization and pose of the vehicle is considered to contain errors. As mentioned above, this allows a control unit 28 of the vehicle 12 to issue actuator commands to correct the vehicle pose and/or position.

In addition, in some embodiments optionally, the time between sensor readings of transponders, in other words, since the last localization update of a pose/position of the vehicle is also determined 528 and compared 530 with a reference value based on the predetermined trajectory of the vehicle and the known positions of transponders along that vehicle's trajectory. If the time since the last pose/position update is above the threshold, then an error is reported 532. If the time is less than the latest update time is stored for future reference against subsequent pose/position updates.

If, however, the pose difference is below the threshold(s), the amount of time since the last pose update is determined. If the time since the last update is greater than the cut-off time, the transponder determined pose is reported has having an error to the vehicle ADS/control system. If the time is less, then the system may store the latest time-stamped pose for comparison against future pose updates.

Figure 6:
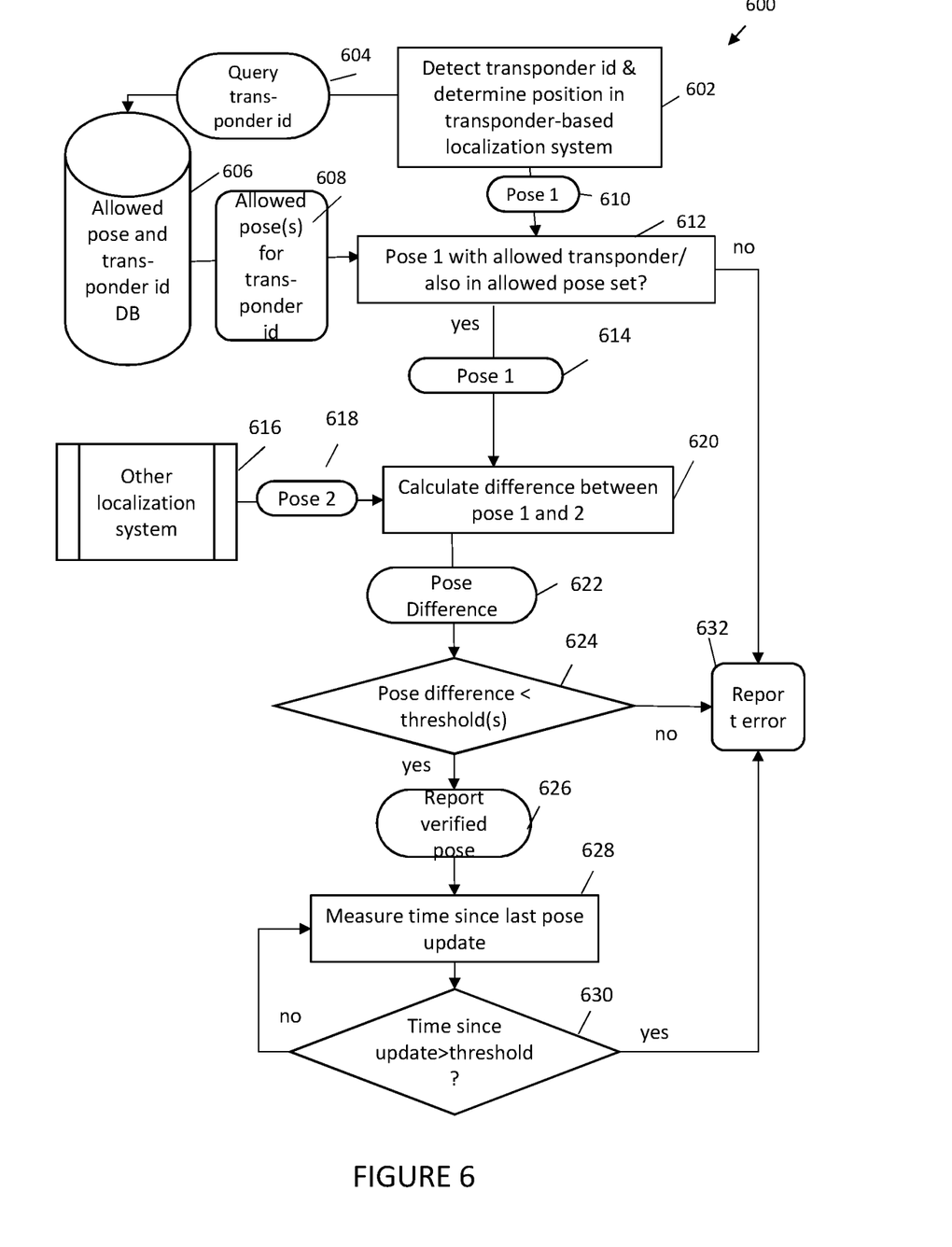
FIG. 6 is a flowchart of fourth comparison process used by a vehicle localization system according to some embodiments of the disclosed technology.

FIG. 6 is a flowchart of fourth pose/position verification method performed by a vehicle 12 using a transponder localization system 18 according to some embodiments of the disclosed technology. In FIG. 6, the transponder localization system 18 also detects 602 the transponder ID when it is determining a vehicle position/pose and sends 604 the detected transponder ID to a transponder ID and position/pose data base 606 to confirm that the transponder ID is allowed for that vehicle's position/trajectory (for example, that it is a transponder in the vicinity of the planned vehicle trajectory rather than one far away) and so that that the allowed pose(s)/position(s) associated with that transponder ID can be checked against pose 1, the pose/position output by the transponder localisation system of the vehicle.

If the check by transponder localization system 18 indicates the pose/position is not allowed and/or that the transponder ID is not an allowed transponder ID, a suitable error is reported 632 to the ADS of the vehicle.

If the check 612 indicates the transponder based position/pose, shown as pose 1 in FIG. 6, is an allowed pose for an allowed transponder ID, pose 1 is output 614 to a pose comparison module or unit 25 for comparison with another pose, shown as pose 2 and labelled 618 in FIG. 6, which has been determined 616 using another, independent, localization system 20, such as, for example, a GNSS positioning system.

The pose comparison unit 25 calculates 620 the difference(s) between pose 1 and pose 2, and the pose different output is then compared 624 to a threshold value. If the pose difference is larger than the pose difference threshold value, the transponder determined pose is reported 632 as a pose error. If the pose difference is less than a threshold, pose 1, the position/pose determined by the transponder localization system is reported 626 a verified pose/position. This allows the pose/position to be handled by the ADS and control system of the vehicle as a pose/position with a high degree of integrity, in other words, it is likely to be a more reliable indication of an accurate pose or position of the vehicle.

In addition, in some embodiments optionally, the time between sensor readings of transponders, in other words, since the last localization update of a pose/position of the vehicle is also determined 628 and compared 630 with a reference value based on the predetermined trajectory of the vehicle and the known positions of transponders along that vehicle's trajectory. If the time since the last pose/position update is above the threshold, then an error is reported 632. If the time is less than the latest update time is stored for future reference against subsequent pose/position updates.

Those of ordinary skill in the art will appreciate that where a condition has been referred to as above or below a threshold in any of the embodiments described herein and/or shown in the drawings, the manner in which the threshold is calculated may include above or equal or below or equal and if the values are presented by inverted parameters, the conditions may be correspondingly adjusted for reporting a vehicle pose error etc.

The time of a localisation update may be compared to a threshold duration since a last localisation update based on time stamp entries associated with the reported pose/position in some embodiments. If the difference in time stamps between the current pose update and the last pose update is less than a pose update threshold time duration, the time of the latest pose update is stored for future iterations of the method. If the pose difference is not less than the threshold pose difference or if the duration of time since the last pose update is above the maximum duration for a pose update, then a vehicle position/pose error is reported by the pose comparison module 25, for example, to the vehicle's ADS or control system as mentioned in relation to FIG. 3, so that correction action can be taken by the vehicle and/or so that the vehicle can be stopped or slowed, for example.

Some embodiments of the disclosed technology are implemented using a vehicle-mounted device, such as a vehicle positioning device of the vehicle, which includes a pose comparison module 25, for example, a pose comparison module 25 which in the form of a software and/or hardware component of the vehicle mounted device which may be integrated with the vehicle mounted device or provided as a separate physical device or part which is configured to be used with the vehicle's existing localization system.

In some embodiments, a control unit of the vehicle, which includes or is otherwise connected to the vehicle mounted device comprising, for example, a vehicle positioning device, may be integrated into or have integrated, an ADS of the vehicle, is configured to implement a method of verifying a position of a vehicle 12 using a vehicle-mounted device.

The method comprises generating first position data 304, 404, 504, 604 for the vehicle-mounted device responsive to receiving 302, 402, 502, 602 data from a transponder-based localization system 18, generating second position data 308, 408, 518, 618 for the vehicle-mounted device responsive to receiving 306, 406,516, 616 data from another localization system 20), and reporting 316, 422, 520, 626 verified vehicle position data for the vehicle, based on a comparison 310, 410, 520, 620 of the data from the other localization system with the data from the transponder-based localization system for the vehicle-mounted device.

In some embodiments of the method, the vehicle position data is verified regularly at a plurality of positions along a vehicle path, wherein a plurality of transponders 16 are provided spaced along the vehicle path. For example, the position may be verified periodically or with a certain maximum amount of time from a previous position verification.

In some embodiments of the method, the vehicle position data is regularly verified by determining 302, 402,502,602), at least once for each identified transponder detected, a position of the detected transponder 16 in the other localization system 20), wherein the transponder has a known static location associated with a transponder identifier in the transponder-based localization system.

In some embodiments of the method, reporting 316, 422, 520, 626 verified vehicle position data is based on whether the comparison 310, 410, 520, 620 determines 312, 414, 522, 622 a difference between in vehicle positions determined using the other localisation system and the transponder-based localization system meets a set of at least one verification conditions, for example, it should be less than an error threshold, for the vehicle position in the other localization system to be reported as a verified vehicle position to a control system of the vehicle.

In some embodiments of the method, the vehicle position data is additionally verified by: determining 422 if a time interval between a current verified position localization update is determined 420 and the time of the last verified position localization update condition was met is below a time interval threshold.

In some embodiments of the method, the vehicle position data is additionally verified by: determining 422, 524, 624 if difference interval between a time stamp associated with when a current verified position was determined 420 and a time stamp for when the last verified position update was determined is below a distance interval threshold.

In some embodiments of the method, the vehicle position data comprises vehicle pose data, and the verified vehicle position data comprises verified pose data.

In some embodiments, the method further comprises, responsive to generating 504, 610 first vehicle pose data, determining 510 if the first vehicle pose is a pose in an allowed pose set 508). The method may then, if the first vehicle pose is not in the allowed pose set, further include reporting 532, 632 a pose error to a control system 28)n of the vehicle, or, alternatively, if the first vehicle pose is in the allowed pose set, reporting the first vehicle pose as a verified vehicle pose 526, 626 to the control system of the vehicle.

In some embodiments of the method, responsive to receiving 302, 402, 502, 602 data from a transponder-based localization system 18), the method further includes determining 604 a transponder identifier for the detected transponder. Determining 612 if the first vehicle pose is in an allowed pose set for the vehicle further comprises in some embodiments determining, based on received 608 data indicating the transponder identifier for that pose is in an allowed transponder identifier set, and if the vehicle pose is not in an allowed pose set for that allowed transponder identifier, reporting 632 an error to a control system 28 of the vehicle. The method may further include reporting the pose as a verified pose 626 to the control system of the vehicle.

FIG. 7 illustrates schematically an example of an apparatus which may be configured to implement one or more methods according to the disclosed embodiments. As shown in FIG. 7, the apparatus comprises a vehicle control system, also referred to herein as a control unit 28, of a vehicle 12. In some embodiments, the control unit 28 comprises the arrangement depicted in FIG. 7. An autonomous vehicle's automated driving system, ADS, may be part of its control system, in other words, it may share one or more resources such as the operating system, memory or processors or processing circuitry, with the control system in some embodiments. The ADS may also be separate from the control system in the sense that one or more resources such as the operating system used, processors or processing circuitry, and memory used by the ADS are different from those used by the control unit. In either type of embodiment of the control system, the ADS of the vehicle is configured to make tactical decisions which, when shared or sent to the control unit, may result in the control unit generating actuator signals to control the operation of the vehicle.

In FIG. 7 an embodiment of the control system of a vehicle is shown as a schematic block diagram of a control unit 28. The control unit 28 is arranged to communicate via at least one antenna 30. It should also be noted that, although not shown in FIG. 7, known conventional features of a control unit 28, such as, for example, a connection to a power source, e.g. a battery, or connections to brake or steering systems, e.g. on-board actuators or sensors for controlling the movement of the vehicle 100, may be assumed to be comprised in the control unit 28, but is not shown or described in any further detail in regards to FIG. 7. The control unit 28 may comprise processor(s) such as, for example, processing circuitry 32 and a memory 34 as shown in FIG. 7. It should also be noted that some or all of the functionality described in the embodiments above as being performed by the control unit 28 may be provided by the processing circuitry 34 executing instructions stored on a computer-readable medium, such as, e.g. the memory 34 shown in FIG. 7.

Alternative embodiments of the control unit 28 may comprise additional components, such as, for example, a generating first position or pose data module 36, a generating second position or pose data unit 38, and a reporting module 40, whereby each module may be configured and responsible for providing its dedicated functionality to support the embodiments described herein.

In some embodiments, the control unit 28 or processing circuitry 34 may be configured to perform a method of verifying a position of a vehicle 12 using a vehicle-mounted device, by generating using generating module 36, first position data 304, 404, 504, 604 for the vehicle-mounted device responsive to receiving 302, 402, 502, 602 data from a transponder-based localization system 1), generating, using generating module 38, second position data 308, 408, 518, 618 for the vehicle-mounted device responsive to receiving 306, 406,516, 616 data from a other localization system (20) and reporting (316, 422, 520, 626), using reporting module 40, verified vehicle position data for the vehicle, based on a comparison (310, 410, 520, 620) of the data from the other localization system with the data from the transponder-based localization system for the vehicle-mounted device.

In some embodiments of the control system 28, the control system 28 comprises memory 34, one or more processors 32, and a data interface 36 configured to receive verified vehicle position or pose data from a vehicle positioning system, wherein the control system 28 is configured, responsive to receiving verified vehicle position or pose data, to generate one or more control signals 46 for controlling a vehicle. The vehicle positioning system 10 which is configured to verify a position of the vehicle 12 may be provided as a vehicle-mounted device in some embodiments. For example, in some embodiments the vehicle positioning system comprises: another localization system 20 configured to determine a vehicle position/pose of the vehicle; and a transponder-based localization system 18, where vehicle position data from the other position system is verified regularly based on position data from the transponder system determined using the vehicle-mounted device by executing a method according to any of the above method aspects or embodiments.

The output of the control system 28 may be used to operate and control an autonomous vehicle 12. For example, by comparing the received current position to a desired trajectory (associated with the transponder positions), and based on the difference in the vehicle position/pose to the desired trajectory position/pose, calculating the desired actuator control signals. In this way, for example, it is possible to also remotely verify if an autonomous vehicle is operating correctly in an autonomous operating zone and if not, cause appropriate actions to be initiated, such as either correcting the vehicle's position/pose and/or causing the vehicle to slow or stop moving.

References to position herein refer to a x,y co-ordinate based type of position where x, y are orthogonal axes in an appropriate co-ordinate system. Pose however, refers in addition to a vehicle's x and y position, to a vehicle's heading or orientation, and may be related to the configuration of the vehicle if articulated for example. The disclosed methods may be used, unless the context clearly indicates otherwise, to either position or pose.

The above embodiments assume that a vehicle 12 is equipped with an antenna which can read specific transponders which are placed within an operation site. The transponders may be placed along the intended vehicle path or in some sort of pattern that will make detection of transponders reasonably frequent and also at locations from which a vehicle's trajectory can be determined.

Each transponder is programmed with an ID and its position is measured, recorded, and connected to the ID. When the antenna (the vehicle) passes a transponder, the ID of the transponder is read and the transponders position in relation to the antenna is captured. By knowing the id of the transponder, the exact position of the transponder can be found by performing a look-up operation or the like in a transponder database which associates the transponder id with its location. By combining this information with the transponders position as determined by a vehicle's antenna, the exact vehicle position can be calculated (see FIG. 1, for example). As will be apparent to anyone of ordinary skill in the art, however, transponder technology and system are known technologies. The disclosed technology uses the transponder localization information along with localization information obtained from another localization source such as a GNSS satellite positioning system to ensure that the vehicle position can be determined more accurately, in other words with higher integrity.

It is also possible, in some embodiments, for the transponder position data to be the other data instead and for the GPS satellite position data to be the secondary data. For example, consider if a detected transponder which is actually nearby was detected in error as a far-away transponder by mistake. In this case the GPS position obtained from a GNSS satellite can be used as secondary data to verify the location of the transponder.

In some embodiments, the pose error information may, in addition to being reported by a pose comparison module or unit 25 to the vehicle's ADS and/or control system, be also reported to a remote server or back office platform configured to manage vehicle operation on the site.

In some of the above embodiments, instead of or in addition to, reporting a pose/position error if the amount of time since the last pose/position was determined using the transponder system, a pose/position error is reported if the distance the vehicle has moved between transponders is greater than a threshold distance. The threshold distance may be based on a predetermined distance between transponders whose positions should be sequential on the trajectory of the vehicle.

In some embodiments, where a vehicle-positioning device is configured to be mounted in use on a vehicle, the vehicle-positioning device comprises means to generate first position or pose data 304, 404, 504, 604 responsive to receiving 302, 402, 502, 602 data from a transponder-based localization system 18, means to generate second position or pose data 308, 408, 518, 618 for the vehicle responsive to receiving 306, 406,516, 616 data from another localization system 20 and means to report 316, 422, 520, 626 verified vehicle position or pose data for the vehicle, based on a comparison 310, 410, 520, 620 of the data from the other localization system 20 with the data from the transponder-based localization system 18.

In some embodiments, the device is configured in use to determine 302 a first position of the device, relative to at least one transponder 16 detected using a transponder-based localization system 18, wherein the at least one transponder has a known geographical location associated with a transponder identifier in the transponder-based localization system. In some embodiments, the device determines 306 a second position of the device using a secondary localization system 20 different to the transponder-based localization system (18) and verifies the first position of the device based on the known geographical location associated with the transponder identifier in relation to the determined second position of the device.

Some, if not all, of the above embodiments may be implemented using computer program code which may be provided as software or hardcoded, for example, as a computer program product configured to be used by a device mounted on or integrated in a vehicle. In some embodiments, the computer program product comprises computer-code which when executed by one or more processors of the vehicle, causes the vehicle to implement a method of verifying a position of the device according to any one of the disclosed embodiments.

For example, the methods described above may be at least partly implemented through one or more processors, such as, the processing circuitry 34 in the control unit 28 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 34 in the control unit 28. The data carrier, or computer readable medium, may be one of an electronic signal, optical signal, radio signal or computer-readable storage medium. The computer program code may e.g. be provided as pure program code in the control unit 28 or on a server and downloaded to the control unit 28. Thus, it should be noted that the functions of the control unit 28 may in some embodiments be implemented as computer programs stored in memory 34, for example, a computer readable storage unit, for execution by processors or processing modules, e.g. the processing circuitry 34 in the control unit 28 of FIG. 7.

The control unit 28 may include or be configured to communicate with an ADS which includes sensor, perception and decision subsystems (not shown in FIG. 7) in some embodiments. The ADS subsystems may generate the transponder localization and other localization information and the pose or position information which, in some embodiments, implements one or more of the disclosed method embodiments to verify the transponder-based localization pose or position information. The verified position information generated using an ADS in some embodiments may be used to send information to the control unit 28 to generate actuator signals for operating the vehicle in some embodiments.

Those skilled in the art will also appreciate that the processing circuitry 34 and the memory or computer readable storage unit 34 described above may refer to a combination of analog and digital circuits, and/or one or more processors configured with software and/or firmware, e.g. stored in a memory, that when executed by the one or more processors such as the processing circuitry 32 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The antenna 30 enables the vehicle 12 to communicate via one or more communications channels with remote entities. The communication channels may be point-to-point, or networks, for example, over cellular or satellite networks which support wireless communications. The wireless communications may conform to one or more public or proprietary communications standards, protocols and/or technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The operating system of the vehicle may further various software components and/or drivers for controlling and managing general system tasks (e.g., memory management, storage device control, power management, etc.) and facilitates communication between various hardware and software components. Communication module 134 facilitates communication with other devices over one or more Where the disclosed technology is described with reference to drawings in the form of block diagrams and/or flowcharts, it is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements, features, functions, or steps than those listed and the words "a" or "an" preceding an element do not exclude the presence of a plurality of such elements, features, functions, or steps. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of methods, and may refer to elements, functions, steps or processes, one or more or all of which may be implemented in one aspect by a computer program product, embodied in a computer-readable medium, including computer-executable instructions, such as program code, executed by computers in networked environments.

A computer-readable medium may include removable and non-removable storage devices including, but not limited to, Read Only Memory (ROM), Random Access Memory, RAM), which may be static RAM, SRAM, or dynamic RAM, DRAM. ROM may be programmable ROM, PROM, or EPROM, erasable programmable ROM, or electrically erasable programmable ROM, EEPROM. Suitable storage components for memory may be integrated as chips into a printed circuit board or other substrate connected with one or more processors or processing modules, or provided as removable components, for example, by flash memory (also known as USB sticks), compact discs (CDs), digital versatile discs (DVD), and any other suitable forms of memory. Unless not suitable for the application at hand, memory may also be distributed over various forms of memory and storage components, and may be provided remotely on a server or servers, such as may be provided by a cloud-based storage solution. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The memory used by any apparatus whatever its form of electronic apparatus described herein accordingly comprise any suitable device readable and/or writeable medium, examples of which include, but are not limited to: any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry.

The memory may store any suitable instructions, data or information, including a computer program, software, an application including one or more of logic, rules, code, tables, etc. and/or other instructions capable of being executed by processing circuitry and, utilized by the apparatus in whatever form of electronic apparatus. Memory may be used to store any calculations made by processing circuitry and/or any data received via a user or communications or other type of data interface. In some embodiments, processing circuitry and memory are integrated. Memory may be also dispersed amongst one or more system or apparatus components. For example, memory may comprise a plurality of different memory modules, including modules located on other network nodes in some embodiments.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method of verifying a position of a heavy-duty vehicle using a vehicle-mounted device, the method comprising:
    generating first position data for the vehicle-mounted device responsive to receiving data from a transponder-based localization system;
    generating second position data for the vehicle-mounted device responsive to receiving data from another localization system; and
    reporting verified vehicle position data for the heavy-duty vehicle, based on a comparison of the data from the another localization system with the data from the transponder-based localization system for the vehicle-mounted device,
    wherein the vehicle position data comprises vehicle pose data, and wherein the verified vehicle position data comprises verified pose data, wherein pose comprises position and orientation of the heavy-duty vehicle,
    wherein the method regularly verifies the vehicle position data at a plurality of positions along a vehicle path, and wherein a plurality of transponders of the transponder-based localization system are provided which are spaced along the vehicle path, wherein the transponder-based localization system localizes the heavy-duty vehicle in relation to the transponders, and
    wherein the heavy-duty vehicle is controlled based on the verified vehicle position data or verified pose data.

2. A method according to claim 1, wherein the heavy-duty vehicle is an articulated vehicle and wherein a plurality of devices for determining orientation are provided on the heavy-duty vehicle, at least one device being mounted on each articulated part of the vehicle in order to determine an entire vehicle pose.

3. The method of claim 1, wherein the method regularly verifies the vehicle position data by determining, at least one time for each transponder identifier detected, a position of a detected transponder in the another localization system, wherein the transponder has a known location associated with a transponder identifier in the transponder-based localization system.

4. The method of claim 1, wherein reporting verified vehicle position data is based on whether the comparison determines a difference between vehicle positions determined using the another localization system and the transponder-based localization system meets a set of at least one verification conditions for the vehicle position in the another localization system to be reported as a verified vehicle position to a control system of the heavy-duty vehicle.

5. The method of claim 1, wherein reporting verified vehicle position data is based on whether the comparison determines a difference between vehicle positions determined using the another localization system and the transponder-based localization system meets a set of at least one verification conditions for the vehicle position in the another localization system to be reported as a verified vehicle position to a control system of the heavy-duty vehicle, wherein the method further comprises additionally verifying the vehicle position by determining if a time interval between a timestamp of a current verified position localization update and a timestamp of a last verified position localization update is below a time interval threshold.

6. The method of claim 1, wherein reporting verified vehicle position data is based on whether the comparison determines a difference between vehicle positions determined using the another localization system and the transponder-based localization system meets a set of at least one verification conditions for the vehicle position in the another localization system to be reported as a verified vehicle position to a control system of the heavy-duty vehicle, and wherein the method further comprises additionally verifying the vehicle position by:
- determining if a distance interval between a timestamp associated with when a current verified position was determined and a timestamp for when a last verified position update was determined is below a distance interval threshold.

7. The method of claim 1, wherein reporting verified vehicle position data is based on whether the comparison determines a difference between vehicle positions determined using the another localization system and the transponder-based localization system meets a set of at least one verification conditions for the vehicle position in the another localization system to be reported as a verified vehicle position to a control system of the heavy-duty vehicle, wherein the method further comprises additionally verifying the vehicle position by determining if a time interval between a timestamp of a current verified position localization update and a timestamp of a last verified position localization update is below a time interval threshold; and additionally verifying the vehicle position by:
- determining if a distance interval between a timestamp associated with when a current verified position was determined and a timestamp for when a last verified position update was determined is below a distance interval threshold.

8. The method of claim 1, wherein the method further comprises:
- responsive to generating first vehicle pose data, determining if a first vehicle pose is a pose in an allowed pose set; and either
- if the first vehicle pose is not in the allowed pose set, reporting a pose error to a control system of the heavy-duty vehicle; or
- if the first vehicle pose is in the allowed pose set, reporting the first vehicle pose as a verified vehicle pose to the control system of the heavy-duty vehicle.

9. The method of claim 8, further comprising:
- responsive to receiving data from the transponder-based localization system,
- determining a transponder identifier for a detected transponder, wherein determining if the first vehicle pose is in an allowed pose set for the heavy-duty vehicle further includes determining based on received data indicating the transponder identifier for that pose is in an allowed transponder identifier set, and
- if the first vehicle pose is not in the allowed pose set for that allowed transponder identifier,
- reporting an error to the control system of the heavy-duty vehicle; and
- reporting the first vehicle pose as a verified pose to the control system of the heavy-duty vehicle.

10. A vehicle positioning system for a heavy-duty vehicle, the vehicle positioning system being configured to verify a pose of the heavy-duty vehicle using a vehicle-mounted device, the vehicle positioning system comprising:
- a transponder-based localization system,
- another localization system configured to determine a vehicle position and/or pose of the heavy-duty vehicle,
- wherein vehicle position data from the another localization system is verified regularly based on position data from the transponder-based localization system determined using the vehicle-mounted device, wherein the vehicle position data comprises vehicle pose data including a position and orientation of the heavy-duty vehicle, wherein verified vehicle position data comprises verified pose data, and the vehicle positioning system includes a pose comparison module, wherein the vehicle positioning system is configured to perform a method of verifying a position of a heavy-duty vehicle using a vehicle-mounted device, the method comprising:
- generating first position data for the vehicle-mounted device responsive to receiving data from the transponder-based localization system;
- generating second position data for the vehicle-mounted device responsive to receiving data from the another localization system; and
- reporting verified vehicle position data for the heavy-duty vehicle, based on a comparison of the data from the another localization system with the data from the transponder-based localization system for the vehicle-mounted device,
- wherein the vehicle position data comprises vehicle pose data, and wherein the verified vehicle position data comprises verified pose data, wherein pose comprises position and orientation of the heavy-duty vehicle,
- wherein the method regularly verifies the vehicle position data at a plurality of positions along a vehicle path, and wherein a plurality of transponders of the transponder-based localization system are provided which are spaced along the vehicle path, wherein the transponder-based localization system localizes the heavy-duty vehicle in relation to the transponders, and
- wherein the heavy-duty vehicle is controlled based on the verified vehicle position data or verified pose data.

11. A heavy-duty vehicle including a control system and an automated driving system (ADS) including a vehicle positioning system, the control system comprising:
- a memory;
- one or more processors;
- a data interface configured to receive verified vehicle pose data from the vehicle positioning system of the ADS, wherein the control system is configured, responsive to receiving verified vehicle position or pose data, to generate one or more control signals for controlling the operation of the heavy-duty vehicle, and wherein the vehicle positioning system is configured to verify a pose of the heavy-duty vehicle using a vehicle-mounted device, the vehicle positioning system comprising:
- a transponder-based localization system,
- another localization system configured to determine a vehicle position and/or pose of the heavy-duty vehicle,
- wherein vehicle position data from the another localization system is verified regularly based on position data from the transponder-based localization system determined using the vehicle-mounted device, wherein the vehicle position data comprises vehicle pose data including a position and orientation of the heavy-duty vehicle, wherein verified vehicle position data comprises verified pose data, and the vehicle positioning system includes a pose comparison module, wherein the control system is configured to perform a method of verifying a position of a heavy-duty vehicle using a vehicle-mounted device, the method comprising:
- generating first position data for the vehicle-mounted device responsive to receiving data from the transponder-based localization system;
- generating second position data for the vehicle-mounted device responsive to receiving data from the another localization system; and reporting verified vehicle position data for the heavy-duty vehicle, based on a comparison of the data from the another localization system with the data from the transponder-based localization system for the vehicle-mounted device, wherein the vehicle position data comprises vehicle pose data, and wherein the verified vehicle position data comprises verified pose data, wherein pose comprises position and orientation of the heavy-duty vehicle, wherein the method regularly verifies the vehicle position data at a plurality of positions along a vehicle path, and wherein a plurality of transponders of the transponder-based localization system are provided which are spaced along the vehicle path, wherein the transponder-based localization system localizes the heavy-duty vehicle in relation to the transponders, and wherein the heavy-duty vehicle is controlled based on the verified vehicle position data or verified pose data.

12. The heavy-duty vehicle of claim 11, wherein the heavy-duty vehicle is an articulated vehicle and wherein a plurality of devices for determining orientation are provided on the heavy-duty vehicle, at least one device on each articulated part of the heavy-duty vehicle in order to determine an entire vehicle pose.

13. A vehicle-positioning device configured to be mounted in use on a heavy-duty vehicle according to claim 11, the vehicle-positioning device comprising:
 a first pose data generator configured to generate first pose data responsive to receiving data from a transponder-based localization system;
 a second pose data generator configured to generate second pose data for the heavy-duty vehicle responsive to receiving data from the another localization system; and
 a verified vehicle pose data reporter configured to report verified pose data for the heavy-duty vehicle based on a comparison of the data from the another localization system with the data from the transponder-based localization system,
 wherein a plurality of transponders are provided which are spaced along the vehicle path.

14. A vehicle-positioning device configured to be mounted in use on a heavy-duty vehicle according to claim 11, the vehicle-positioning device comprising:
 a first pose data generator configured as one or more coded modules in software and/or in hardware to generate first pose data responsive to receiving data from a transponder-based localization system;
 a second pose data generator configured as one or more coded modules in software and/or in hardware to generate second pose data for the heavy-duty vehicle responsive to receiving data from the another localization system; and
 a verified vehicle pose data reporter configured as one or more coded modules in software and/or in hardware to report verified pose data for the heavy-duty vehicle based on a comparison of the data from the another localization system with the data from the transponder-based localization system,
 wherein the heavy-duty vehicle is an articulated heavy-duty vehicle, and at least one vehicle-positioning device is mounted on at least one articulated part of the articulated heavy-duty vehicle.

15. The vehicle-positioning device of claim 13, wherein the vehicle-positioning device is configured in use to:
 determine a first position of the vehicle-positioning device, relative to at least one transponder detected using the transponder-based localization system, wherein the at least one transponder has a known geographical location associated with a transponder identifier in the transponder-based localization system;
 determine a second position of the vehicle-positioning device using a secondary localization system different to the transponder-based localization system; and
 verify the first position of the vehicle-positioning device based on the known geographical location associated with the transponder identifier in relation to the determined second position of the vehicle-positioning device.

\* \* \* \* \*